(12) United States Patent
Wang et al.

(10) Patent No.: US 9,929,941 B2
(45) Date of Patent: Mar. 27, 2018

(54) FAST CONVERGENCE FOR REDUNDANT EDGE DEVICES

(71) Applicant: CISCO TECHNOLOGY, INC., San Jose, CA (US)

(72) Inventors: Peng Wang, Shanghai (CN); Jeffrey Cai, Shanghai (CN); Bo Sun, Shanghai (CN); Yu Jiang, Shanghai (CN)

(73) Assignee: Cisco Technology, Inc., San Jose, CA (US)

(*) Notice: Subject to any disclaimer, the term of this patent is extended or adjusted under 35 U.S.C. 154(b) by 109 days.

(21) Appl. No.: 14/721,828

(22) Filed: May 26, 2015

(65) Prior Publication Data
US 2016/0352617 A1 Dec. 1, 2016

(51) Int. Cl.
*H04L 12/50* (2006.01)
*H04L 12/707* (2013.01)
*H04L 12/26* (2006.01)
*H04L 29/12* (2006.01)

(52) U.S. Cl.
CPC .............. *H04L 45/22* (2013.01); *H04L 43/10* (2013.01); *H04L 61/103* (2013.01); *H04L 61/2084* (2013.01)

(58) Field of Classification Search
CPC ....... H04L 45/28; H04L 45/586; H04L 45/64; H04L 41/0654; H04L 61/103; H04L 12/4641
See application file for complete search history.

(56) References Cited

U.S. PATENT DOCUMENTS

| | | |
|---|---|---|
| 2005/0111352 A1* | 5/2005 | Ho .................... H04L 43/16 370/219 |
| 2008/0205376 A1 | 8/2008 | Patmon et al. |
| 2014/0047098 A1 | 2/2014 | Rajah et al. |
| 2014/0307541 A1 | 10/2014 | Badoni et al. |
| 2014/0317249 A1 | 10/2014 | Janakiraman et al. |
| 2014/0321265 A1 | 10/2014 | Pitchai et al. |

OTHER PUBLICATIONS

"Wired/Wireless Internet Communications;" 9th IFIP TC 6 International Conference, WWIC 2011, Vilanova i la Geltrú, Spain, Jun. 15-17, 2011, Proceedings; pp. 338-349.*

* cited by examiner

*Primary Examiner* — Marsha D. Banks Harold
*Assistant Examiner* — Elton Williams
(74) *Attorney, Agent, or Firm* — Cindy Kaplan

(57) ABSTRACT

In one embodiment, a method includes identifying at a first edge device, a failure at a second edge device, the first and second edge devices located in a local network site in communication with remote network sites in an overlay network, changing a state of a routing locator address at the first edge device from down to up in response to the failure at the second edge device, the routing locator address initially associated with the second edge device, and advertising the routing locator address at the first edge device in an underlay network so that packets from the remote network sites are forwarded to the first edge device upon convergence in the underlay network. An apparatus and logic are also disclosed herein.

20 Claims, 4 Drawing Sheets

US 9,929,941 B2

FAST CONVERGENCE FOR REDUNDANT EDGE DEVICES

TECHNICAL FIELD

The present disclosure relates generally to communication networks, and more particularly, to fast convergence for redundant edge devices.

BACKGROUND

Network sites often include two or more edge devices to provide redundancy in the case of failure at one of the edge devices or a path containing the device. In order for a network to take advantage of the built in redundancy, traffic should quickly switch to an alternate path containing the redundant device. Redundancy with fast convergence provides increased network availability, which translates into higher productivity and possibly higher revenues and cost savings. As networks continue to grow with an increasing number of network sites, delays in identifying a failure and switching traffic to a backup path may reduce network availability.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
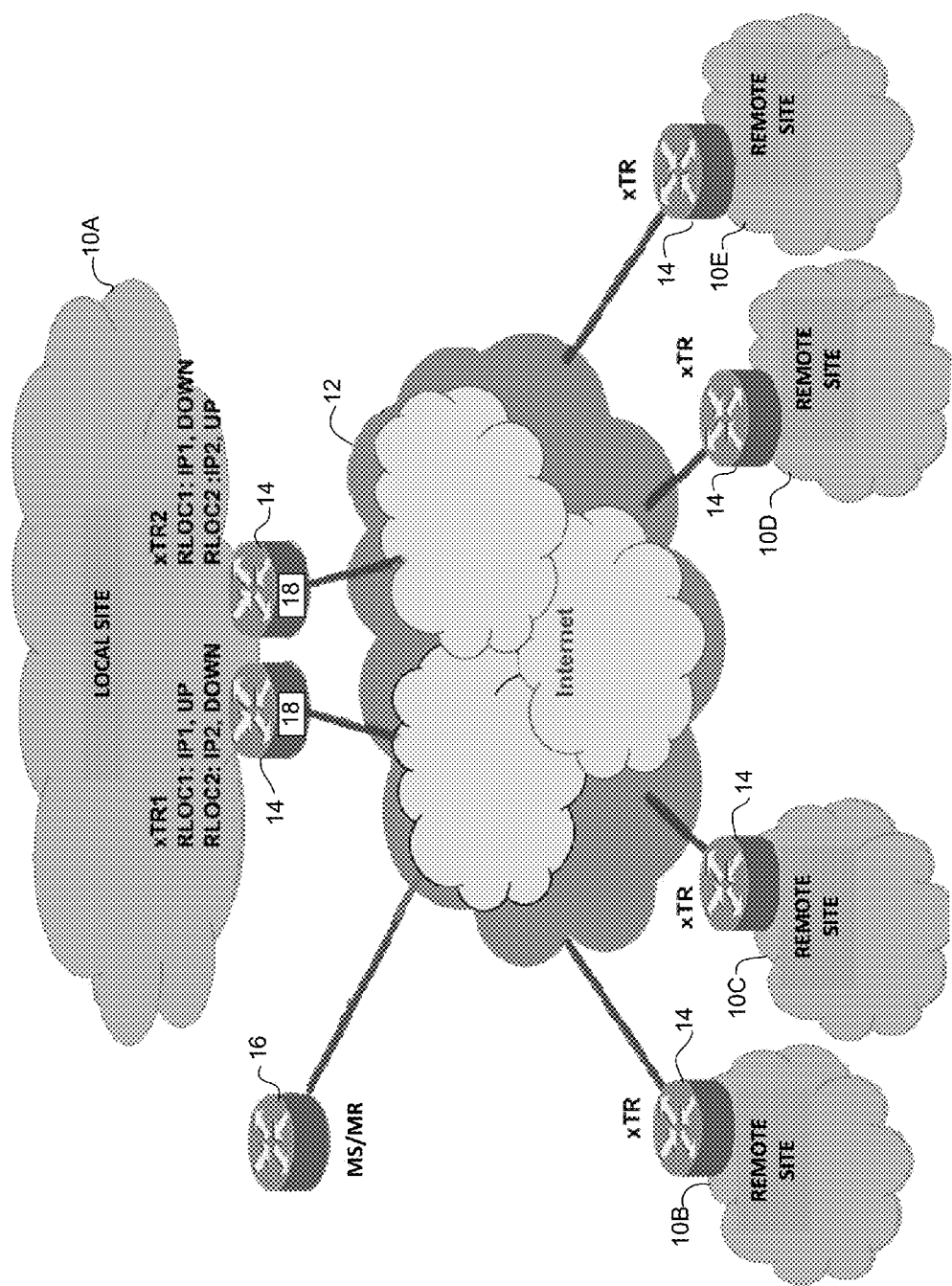
FIG. 1 illustrates an example of a network in which embodiments described herein may be implemented.

In one embodiment, a method generally comprises identifying at a first edge device, a failure at a second edge device, the first and second edge devices located in a local network site in communication with remote network sites in an overlay network, changing a state of a routing locator address at the first edge device from down to up in response to the failure at the second edge device, the routing locator address initially associated with the second edge device, and advertising the routing locator address at the first edge device in an underlay network so that packets from the remote network sites are forwarded to the first edge device upon convergence in the underlay network.

In another embodiment, an apparatus generally comprises a plurality of network interfaces for communication in a local network site of an overlay network and with an underlay network, a processor for identifying at a first edge device, a failure at a second edge device, the first and second edge devices located in the local network site and in communication with remote network sites, changing a state of a routing locator address at the first edge device from down to up in response to the failure at the second edge device, the routing locator address initially associated with the second edge device, and advertising the routing locator address at the first edge device in the underlay network so that packets from the remote network sites are forwarded to the first edge device upon convergence in the underlay network, and memory for storing routing locator addresses and a state of each of said routing locator addresses.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Locator Identifier Separation Protocol (LISP) is an example of a protocol that uses routing locators and endpoint identifiers to improve the scalability of a routing system. The LISP architecture provides a mechanism to separate out identification and location semantics from the current definition of an IP address. IP address semantics are extended to incorporate a distinction between routing locators (RLOCs) for routing through core networks and endpoint identifiers (EIDs) for identifying network sessions between devices.

An edge device in a LISP architecture (e.g., LISP xTR (ingress tunnel router (ITR)/egress tunnel router (ETR)), may do ingress load sharing with another xTR at the same local network site. The xTRs at remote network sites may choose to send LISP packets to ether xTR at the local LISP site. If one of the xTRs is down, all remote xTRs will need to update their local EID-RLOC map cache to switch traffic to the other xTR. In a first example, a map server/map resolver (MS/MR) may start a monitoring process to identify the reachability of the xTRs at the local network site. If a failure occurs at either xTR, the MS/MR may send notifications to xTRs in remote sites. The xTRs can then update their EID-RLOC map caches upon receiving the notification. In a second example, the xTRs in remote sites may run a probe process, in which they send probe messages periodically to monitor the reachability of the xTRs in the local site. Failure of either xTR may be detected by a probe message and the xTRs at the remote sites can update their EID-RLOC map cache based on this information.

Service providers often deploy very high scalable networks, which can include, for example, thousands of remote network sites. Both of the above described methods have limitations in a highly scalable overlay (e.g., LISP) network. For example, if there are a large number of remote sites, the MS/MR in the first example needs to generate a large number of notification messages. Also, a long delay may be introduced in order to generate and send these notifications. In the second example, a high number of periodic probe messages are needed due to the large number of network sites, which may consume a large amount of network bandwidth.

The embodiments described herein provide for fast convergence for redundant edge devices in network overlays with any number of network sites. As described in detail below, there is no need for a map server to detect the reachability of redundant edge devices or for edge devices at remote sites to run probe processes. Thus, the embodiments provide fast convergence without impacting network bandwidth.

Referring now to the drawings, and first to FIG. 1, an example of a network in which embodiments described herein may be implemented is shown. A plurality of network sites (e.g., data center, group of network devices) 10A, 10B, 10C, 10D, 10E are in communication through a core network 12 (e.g., Internet, L2 metro Ethernet core, L3 IP network, MPLS, or any other type of network). Each network site 10A, 10B, 10C, 10D, 10E and core network 12 may include any number of edge devices or intermediate (core) nodes (e.g., routers, switches, access layer devices, gateways, or other network devices), which facilitate passage of data within the network. Network sites 10A, 10B, 10C, 10D, 10E may include any number of endpoints (stations, user devices, clients, client devices) and may be in communication with one or more other networks.

In one embodiment, the network is a multilayer network comprising an overlay network (e.g., LISP network comprising LISP network sites 10A, 10B, 10C, 10D, 10E) and an underlay network (e.g., IP (Internet Protocol) network 12). The network overlay is a virtual network of interconnected nodes that share an underlying physical network.

The network shown in the example of FIG. 1 includes local network site 10A and four remote network sites 10B, 10C, 10D, 10E, each comprising one or more edge devices 14 configured to perform xTR (ingress tunnel router (ITR)/egress tunnel router (ETR)) functions in an overlay network (e.g., LISP network). The edge devices 14 may be routers, switches, gateways, or other network devices configured to perform routing or forwarding functions (e.g., L2, L3, or L2/L3 devices) and support a locator/identifier split method.

In one embodiment, the network sites 10A, 10B, 10C, 10D, 10E and the edge devices 14 are configured for operation in accordance with LISP. As previously described, LISP creates two address (name) spaces; endpoint identifiers (EIDs), which are assigned to endpoints, and routing locators (RLOCs), which are assigned to network devices to indicate a location within the network topology. EID reachability across LISP sites 10A, 10B, 10C, 10D, and 10E is achieved by resolving EID-to-RLOC mappings. Reachability within the RLOC space is achieved by traditional routing methods in the underlay network (e.g., through core network 12).

It is to be understood that LISP is used herein as an example and that other protocols that provide a locator/identifier split may be used, without departing from the scope of the embodiments. Thus, the term "locator identifier separation protocol" as used herein may refer to any protocol that provides a separation between an object identifier and its location. For example, the embodiments described herein may be used in a system operable to map and encapsulate packets at an edge device to provide a network overlay. The term "routing locator address" as used herein may refer to any address used to identify a location in the underlay network.

The network further includes a mapping system comprising one or more mapping databases. In one embodiment, the mapping system comprises a map server/map resolver (MS/MR) 16. The mapping system may include any number of map servers, map resolvers, or map databases distributed throughout the network. For example, the mapping system may comprise any number of physical or virtual devices located in one or more networks and may include one or more databases stored on one or more network devices. In one example, the map server (MS) implements the mapping database distribution by accepting registration requests from its client ETRs, aggregating the EID prefixes, and advertising the aggregated prefixes. The map resolver (MR) accepts encapsulated map-request messages sent by ITRs, decapsulates them, and then forwards them toward the ETRs responsible for the EIDs being requested. Each ITR maintains a cache of the mapping database entries that it needs at a particular time. It is to be understood that the mapping system described herein is only an example and that other mapping systems and databases may be used without departing from the scope of the embodiments.

In the example shown in FIG. 1, local LISP site 10A includes two redundant edge devices (xTR1, xTR2), which may load share traffic destined to the remote network sites 10B, 10C, 10D, 10E. For example, xTR1 and xTR2 may be configured such that a database mapping EID-prefix IP1 is assigned a priority of 1 with a weight of 50 and a database mapping EID-Prefix IP2 is assigned a priority of 1 with a weight of 50. The remote xTRs at network sites 10B, 10C, 10D, and 10E may choose to send LISP packets to either xTR1 or xTR2 based, for example, on the results of a hash algorithm. It is to be understood that this is only an example of load sharing and that other weights may be used to distribute the load over the redundant xTRs (xTR1, xTR2) or other load balancing algorithms may be used.

In the example shown in FIG. 1, each of the redundant edge devices 14 at site 10A is assigned two routing locator addresses (IP1 and IP2). In one embodiment, the redundant edge devices each include a redundancy manager 18 operable to keep one RLOC address up and the other RLOC address down during normal operation (i.e., both xTR1 and xTR2 operating). When both xTR1 and xTR2 are operating, the redundancy manager 18 at xTR1 sets IP1 up and IP2 down, while the redundancy manager 18 at xTR2 sets IP1 down and IP2 up. Thus, IP1 is initially associated with xTR1 and traffic addressed to IP1 is forwarded to xTR1. Similarly, IP2 is initially associated with xTR2 and traffic addressed to IP2 is forwarded to xTR2.

In one embodiment, the redundant routers xTR1 and xTR2 are operable to detect the status of the other router. For example, the routers 14 may use keep alive messages (e.g., utilizing BFD (Bidirectional Forwarding Detection) or other suitable protocol) to detect the status of the other router at the local network site 10A.

Figure 2:
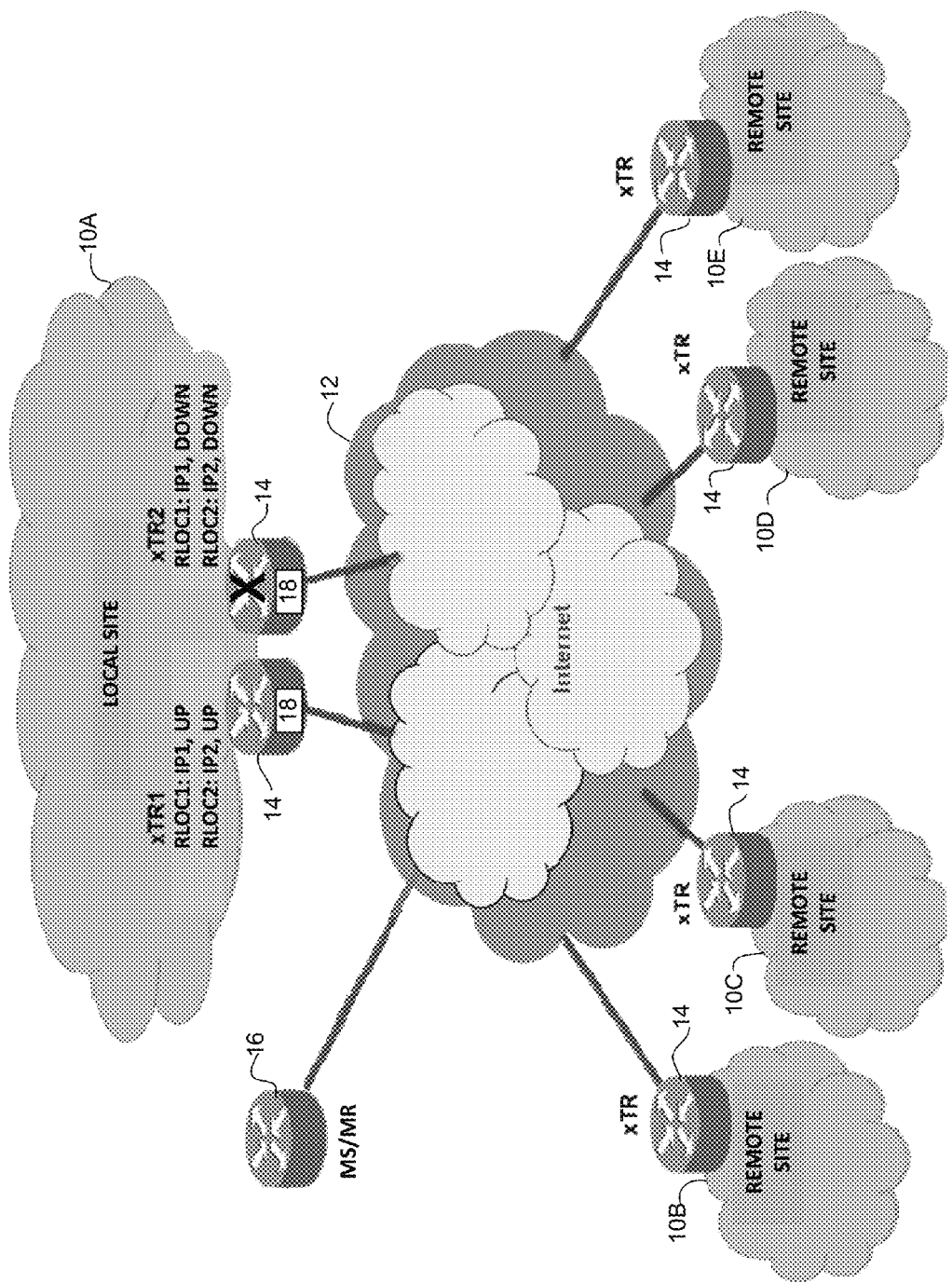
FIG. 2 illustrates a failure in the network shown in FIG. 1.

FIG. 2 illustrates an example of the network shown in FIG. 1 with a failure at the second edge device xTR2. When the first edge device xTR1 detects the failure at xTR2, the redundancy manager 18 at xTR1 changes the state of RLOC address IP2 (initially assigned to xTR2) from down to up and advertises the reachability of IP2 through xTR1 to the underlay network (core network 12). Convergence occurs on the underlay IP network and all packets addressed to IP2 are now forwarded to xTR1. As shown in FIG. 2, both addresses IP1 and IP2 are up on xTR1 and there is no need to update anything at the remote xTRs or MS/MR 16. The overlay network is converged.

The speed of the underlay network convergence depends on the underlay network topology. It will typically be very fast if an IP address is just moved from one xTR to another xTR at the same network site. The underlay IP network convergence is not dependent on the number of overlay network sites, and therefore fast convergence can be achieved in any scale overlay network.

It is to be understood that the network shown in FIGS. 1 and 2, and described above is only an example and the embodiments described herein may be implemented in networks comprising different network topologies or network devices, or using different network protocols without departing from the scope of the embodiments. For example, the network may include any number or type of network devices that facilitate passage of data over the network (e.g., routers, switches, gateways), network elements that operate as endpoints or hosts (e.g., servers, virtual machines, clients), and any number of network sites in communication with any number of core networks. The network may include, for example, ten thousand, or more or less than ten thousand network sites in communication with one or more core networks. Also, each network site may include any number of edge devices, sources, or receivers. For example, local site 10A in FIG. 1 may include any number of redundant xTRs, each with a different address associated therewith. Also, more than one network site may include redundant edge devices configured for fast convergence. Thus, any network site comprising redundant edge routers may be referred to as a local network site, with the other network sites referred to as remote sites. As previously noted, the xTRs shown in FIG. 1 and described herein are configured to operate in a LISP architecture, however, other locator identifier separation protocols or overlay/underlay network architectures may be used without departing from the scope of the embodiments.

Figure 3:
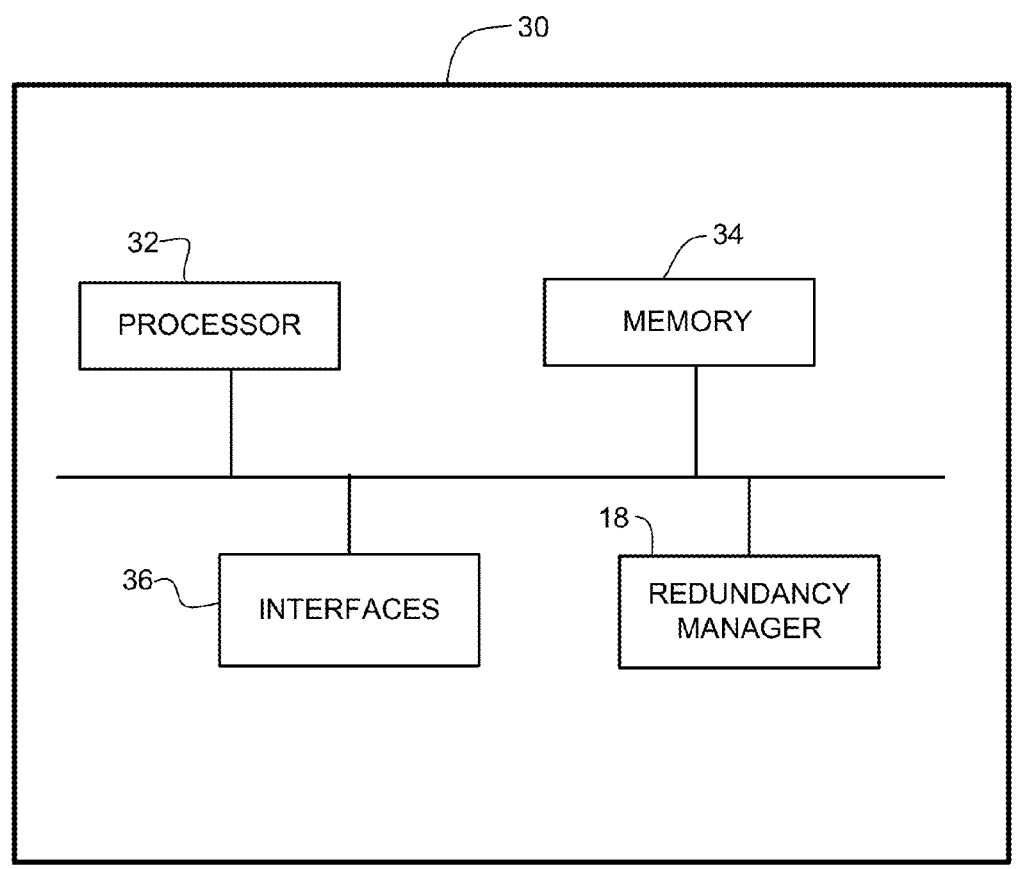
FIG. 3 depicts an example of a network device useful in implementing embodiments described herein.

FIG. 3 illustrates an example of a network device 30 (e.g., xTR1, xTR2) that may be used to implement the embodiments described herein. In one embodiment, the network device 30 is a programmable machine that may be implemented in hardware, software, or any combination thereof. The network device 30 includes one or more processor 32, memory 34, network interfaces 36, and redundancy manager 18.

Memory 34 may be a volatile memory or non-volatile storage, which stores various applications, operating systems, modules, and data for execution and use by the processor 32. Memory 34 may include, for example, any suitable data structure for maintaining status information for RLOC addresses (e.g., up/down). Redundancy manager 18 (e.g., code, logic, software, module, etc.) may also be stored in memory 34. The network device 30 may include any number of memory components.

Logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 30 may include any number of processors 32.

The network interfaces 36 may comprise any number of interfaces (linecards, ports) for receiving data or transmitting data to other devices. The network interface may include, for example, an Ethernet interface for connection to a computer or network. In one example, one of the network interfaces 36 may communicate in the local network site 10A of the overlay network and another of the network interfaces may communicate with the core network (underlay network) 12 (FIGS. 1 and 3). The network interfaces 36 may be configured to transmit or receive data using a variety of different communication protocols. The interfaces 36 may include mechanical, electrical, and signaling circuitry for communicating data over physical links coupled to the network.

It is to be understood that the network device 30 shown in FIG. 3 and described above is only an example and that different configurations of network devices may be used. For example, the network device 30 may further include any suitable combination of hardware, software, algorithms, processors, devices, components, modules, or elements operable to facilitate the capabilities described herein.

Figure 4:
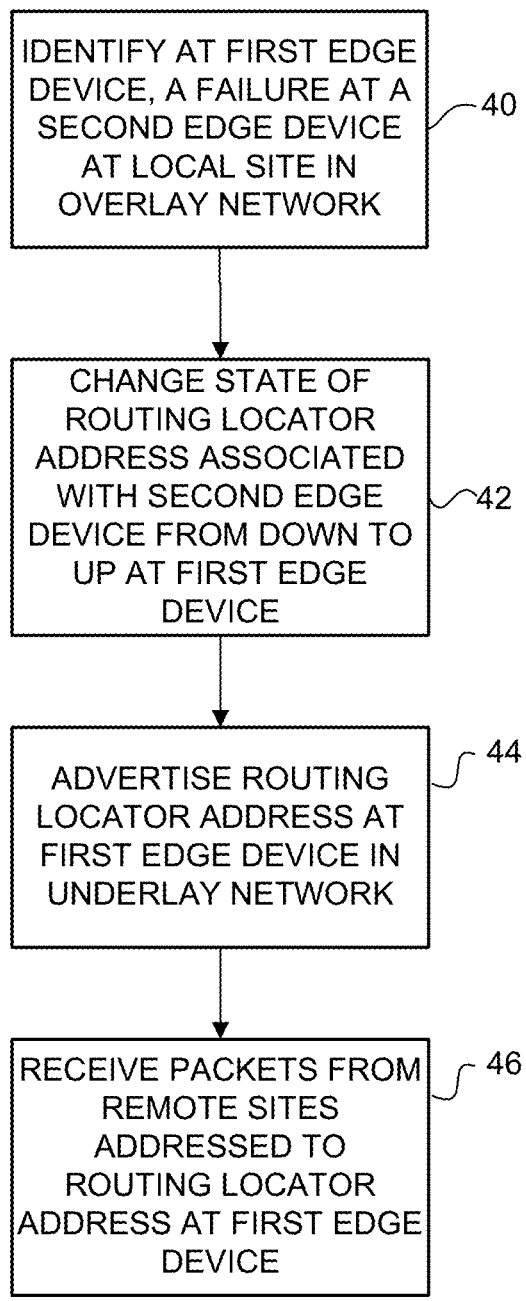
FIG. 4 is a flowchart illustrating an overview of a process for fast convergence in the network of FIG. 2, in accordance with one embodiment.

FIG. 4 is a flowchart illustrating an overview of a process for fast convergence at a redundant edge device, in accordance with one embodiment. At step 40, a first edge device (e.g., xTR1 in FIG. 2) identifies a failure at a second edge device (e.g., redundant router xTR2) located in the same local network site (e.g., network site 10A in FIG. 2) and load sharing traffic for remote network sites in an overlay network (e.g., network sites 10B, 10C, 10D, and 10E in FIG. 2). Upon identifying the failure at xTR2, edge device xTR1 changes a state of a routing locator address (e.g., RLOC address IP2) from down to up (step 42). The routing locator address IP2 was initially associated with the second edge device xTR2 before the failure, as shown in FIG. 1. The routing locator address IP2 is advertised by the first edge device xTR1 in an underlay network (e.g., IP network 12 in FIG. 2) (step 44). Packets from the remote network sites 10B, 10C, 10D, 10E addressed to IP2 are forwarded to the first edge device xTR1 upon convergence in the underlay network (step 46). There is no need for any updates at the remote sites or overlay network, therefore fast convergence can be obtained regardless of the scaling of the overlay network.

It is to be understood that the process shown in FIG. 4 and described above is only an example and that steps may be added, combined, or modified without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:

identifying at a first edge device, a failure at a second edge device, the first and second edge devices located in a local network site in communication with remote network sites in an overlay network comprising a plurality of local and remote network sites in communication over a core network, the first and second edge devices configured to perform ingress tunnel router/egress tunnel router functions in the overlay network and assigned different routing locator addresses used for routing in the core network;

changing a state of a routing locator address assigned to the second edge device, at the first edge device from down to up in response to said failure at the second edge device; and advertising said routing locator address assigned to the second edge device at the first edge device in an underlay network comprising a plurality of core nodes in the core network so that packets from the remote network sites are forwarded to the first edge device upon convergence in said underlay network;

wherein the packets from the remote network sites are forwarded to the first edge device without updating a remote tunnel router or mapping server in said overlay network and wherein the first and second edge devices are operable to detect a status of the other edge device in the local network site.

2. The method of claim 1 wherein the first edge device comprises an ingress tunnel router/egress tunnel router.

3. The method of claim 1 wherein the overlay network comprises a Locator Identifier Separation Protocol (LISP) network and the underlay network comprises an Internet Protocol (IP) network.

4. The method of claim 1 wherein no updates are made to local endpoint identifier-routing locator map caches at the remote network sites in response to said failure.

5. The method of claim 1 wherein the overlay network comprises thousands of remote network sites.

6. The method of claim 1 further comprising transmitting keep alive messages to the second edge device for use in identifying said failure.

7. The method of claim 1 wherein the first and second edge devices load share traffic for the remote network sites.

8. The method of claim 1 wherein the overlay network comprises a system mapping endpoint identifiers to routing locators and wherein no changes are made to the system in response to said failure.

9. An apparatus comprising:
 a plurality of network interfaces for communication in a local network site of an overlay network and with an underlay network, the overlay network comprising a plurality of local and remote network sites in communication over the underlay network;
 a processor for identifying at a first edge device, a failure at a second edge device when the first and second edge devices are located in the local network site and in communication with a plurality of remote network sites, the first and second edge devices configured to perform ingress tunnel router/egress tunnel router functions in the overlay network and assigned different routing locator addresses, changing a state of a routing locator address assigned to the second edge device, at the first edge device from down to up in response to said failure at the second edge device, and advertising said routing locator address assigned to the second edge device at the first edge device in said underlay network so that packets from the remote network sites are forwarded to the first edge device upon convergence in said underlay network; and
 memory for storing routing locator addresses and a state of each of said routing locator addresses;
 wherein the packets from the remote network sites are forwarded to the first edge device without updating a remote tunnel router or mapping server in said overlay network and wherein the first and second edge devices are operable to detect a status of the other edge device in the local network site.

10. The apparatus of claim 9 wherein the first edge device comprises an ingress tunnel router/egress tunnel router.

11. The apparatus of claim 9 wherein the overlay network comprises a Locator Identifier Separation Protocol (LISP) network and the underlay network comprises an Internet Protocol (IP) network.

12. The apparatus of claim 9 wherein no updates are made to local endpoint identifiers-routing locators map caches at the remote network sites in response to said failure.

13. The apparatus of claim 9 wherein the processor is operable to transmit keep alive messages to the second edge device for use in identifying said failure.

14. The apparatus of claim 9 wherein each of said routing locator addresses stored in memory are initially associated with one of the edge devices at the local network site.

15. Logic encoded on one or more non-transitory computer readable media for execution and when executed operable to:
 identify at a first edge device, a failure at a second edge device, the first and second edge devices located in a local network site in communication with remote network sites in an overlay network comprising a plurality of local and remote network sites in communication over a core network, the first and second edge devices configured to perform ingress tunnel router/egress tunnel router functions in the overlay network and assigned different routing locator addresses used for routing in the core network;
 change a state of a routing locator address assigned to the second edge device, at the first edge device from down to up in response to said failure at the second edge device; and
 advertise said routing locator address assigned to the second edge device at the first edge device in an underlay network comprising a plurality of core nodes in the core network so that packets from the remote network sites are forwarded to the first edge device upon convergence in said underlay network;
 wherein the packets from the remote network sites are forwarded to the first edge device without updating a remote tunnel router or mapping server in said overlay network and wherein the first and second edge devices are operable to detect a status of the other edge device in the local network site.

16. The logic of claim 15 wherein the first edge device comprises an ingress tunnel router/egress tunnel router.

17. The logic of claim 15 wherein the overlay network comprises a Locator Identifier Separation Protocol (LISP) network and the underlay network comprises an Internet Protocol (IP) network.

18. The logic of claim 15 wherein no updates are made to local endpoint identifiers-routing locators map caches at the remote network sites in response to said failure.

19. The logic of claim 15 wherein the overlay network comprises thousands of remote network sites.

20. The logic of claim 15 wherein the logic is further operable to transmit keep alive messages to the second edge device for use in identifying said failure.

* * * * *